July 31, 1951 — E. J. MANASEK — 2,562,562
PIPE AND CONDUIT SUPPORTING CLAMP
Filed May 17, 1946
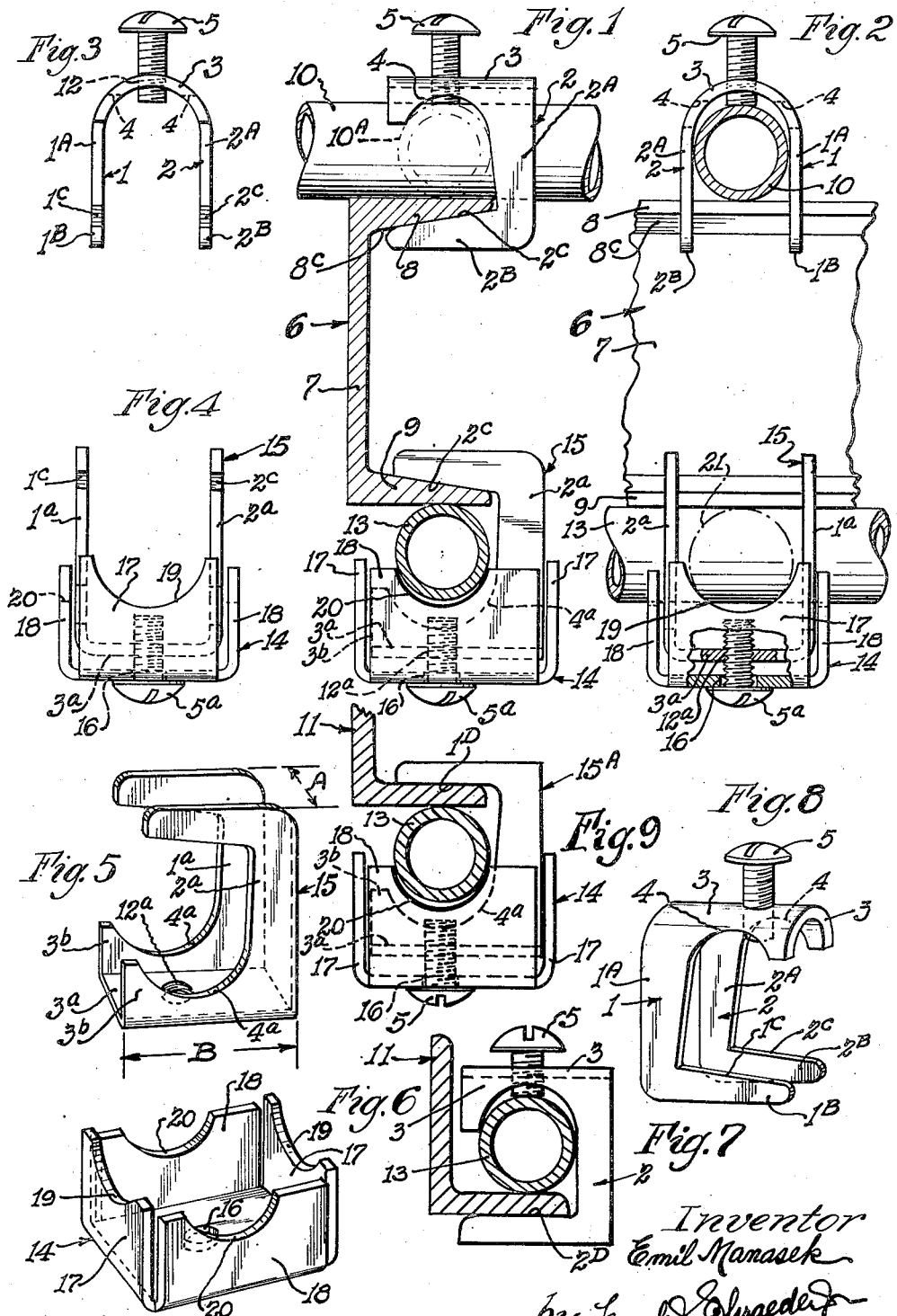
Inventor
Emil Manasek
by Frank J. Schraeder
Attorney.

Patented July 31, 1951

2,562,562

UNITED STATES PATENT OFFICE 2,562,562

PIPE AND CONDUIT SUPPORTING CLAMP

Emil J. Manasek, Riverside, Ill.

Application May 17, 1946, Serial No. 670,485

1 Claim. (Cl. 248—228)

The primary object of the present invention is to provide a simple and novel clamping means for securely fastening a pipe or conduit directly to a flange of a structural steel supporting member such as, for example, a channel, an angle iron, or an I beam, or the like, in either of two positions relatively to the longitudinal axis of the structural member, that is, parallely or transversely to the longitudinal axis of the structural supporting member.

Pipes and conduits for electrical distribution systems, and for other purposes, are commonly supported on or from structural steel members constituting parts of the frame structures for buildings. Various kinds of devices or fittings are now being used for this purpose, but I know of none which is entirely satisfactory due to the fact that all of these present devices are necessarily complicated, composed of numerous parts and costly to manufacture and install. The simplest device for fastening a pipe or conduit directly to a rectilinear member is the well known C clamp which, however, does not provide a stable and secure attachment for supporting a pipe or conduit on or from a rectilinear member without some form of additional clamping means and which C type clamp would not be adaptable for supporting pipes on or from standard structural steel members having beveled or angularly faced flanges without the use of additional intermediate members or other clamping devices auxiliary to the C type clamp. Furthermore, this C type of clamp usually permits the pipe or conduit to be placed in only one position relatively to the rectilinear member, namely, approximately parallel to the longitudinal axis of that member.

Other known pipe and conduit clamp-like devices for supporting same on standard structural steel members are not only complicated but in most instances require that securing holes be drilled in the structural member.

Viewed in one of its aspects, the present invention may be said to have for its object to provide a simple and improved clamp which can be manufactured at low cost and quickly applied to a supporting member without drilling any holes, requiring only the turning of a screw to securely fasten the conduit directly to the structural member and which clamp will hold a conduit securely in either of two positions, in one of which the conduit lies parallel to the supporting member, while in the other it extends in the transverse direction thereto.

The various features of novelty whereby the present invention in characterized will hereinafter be pointed out with particularity in the claims; but, for a full understanding of the invention and of its objects and advantages, reference may be had to the following detailed description taken in connection with the accompanying drawing, wherein:

Fig. 1 is a view showing a structural steel channel having two flanges to which are clamped two pipes by means of devices that embody the present invention in two forms differing somewhat from each other, the upper pipe lying crosswise of the channel and the lower pipe extending lengthwise thereof;

Fig. 2 is a view looking at the side of the channel and showing all the parts that appear in Fig. 1;

Fig. 3 is an end view of the upper clamp illustrated in Figs. 1 and 2, showing the opposite end from that appearing in Fig. 2;

Fig. 4 is an end view of the lower clamp device illustrated in Figs. 1 and 2, showing the opposite end of the device appearing in Figs. 1 and 2;

Figs. 5 and 6 are perspective views of the two stampings that are shown in assembled relation to each other in Fig. 4;

Fig. 7 illustrates a side view of the clamp shown in Fig. 3 modified to adapt it for connection to a leg of an angle iron;

Fig. 8 is a perspective view of the clamp shown in Fig. 3; and

Fig. 9 is a side view of the clamp part shown in Fig. 5 but modified to adapt it for connection to a leg of an angle iron.

The simpler of the two forms of my invention disclosed is that shown by itself in Figs. 3 and 8. It consists of two laterally spaced L-shaped arms 1 and 2. As shown, the upper ends of the vertically disposed leg portions 1A and 2A are joined by an integral arcuate portion 3; the radius of the portion 3 being preferably equal to that of the largest pipe or conduit to which the device can be applied. The arcuate portion 3 is preferably approximately as long as the horizontally disposed support-engaging leg portions 1B and 2B. Viewed from the side the device looks like a C clamp while, from the front, it appears to have the shape of an inverted U. In other words, the device comprises two laterally spaced C-shaped clamp bodies transversely connected together at adjacent ends by an arcuate portion 3. The long edges of the arcuate portion 3 are recessed adjacent to their inner ends to enhance the utility of the device by providing seats 4 having arcuate conduit-engaging edges. A screw 5 is screwthreaded through the middle of the arc of the portion 3 and is substantially aligned with the center of the recessed seats 4 and constitutes an adjustable conduit-engaging element.

An important feature of my invention is found in the angular disposition of the edges 1$^C$ and 2$^C$ of the lateral legs 1$^B$ and 2$^B$ relatively to the longitudinal axis of the pipe or conduit 10, namely, providing such flange-engaging edges 1$^C$ and 2$^C$ with a slope conforming or corresponding to the angular inner face of the flange 8 of a supporting member such as the structural steel channel 6 or an I beam to which the pipe or conduit 10 is to be secured. For securement of a pipe or conduit to an angle iron 11 shown in Figs. 7 and 9, the flange-engaging edges 1$^D$ and 2$^D$ are disposed substantially at a right-angle relatively to the axis of the tightening screw 5.

The manner of using the clamp just described is illustrated in Figs. 1 and 2, wherein there is shown, only by way of example, a channel-shaped structural supporting member 6 having the usual web 7 and flanges 8 and 9. A pipe 10 is shown fastened to the channel member 6 and extends transversely thereof. With the screw 5 backed off, the clamp may quickly be inserted over the pipe shown in position on the member 6 so that the L-shaped arms embrace opposite sides of the pipe and the arcuate portion 3 extends over a side portion of the pipe. The clamp may then be slid on the pipe until the horizontal leg portions 1$^B$ and 2$^B$ slip under the flange 8 with their beveled or sloping edges 1$^C$ and 2$^C$ in face contact with the inner face 8$^C$ of the flange 8. When the vertical arm portions 1$^A$ and 2$^A$ touch, or almost touch, the edge of the flange 8, the screw may then be turned until it presses down on the pipe and draws the horizonal leg portions 1$^B$ and 2$^B$ tightly against the inner face 8$^C$ of the flange 8. It will be seen that the clamp has at least a three point bearing on the objects that are being clamped together, two such points being in spaced relation on the flange 8 of the supporting member 6 and the third point being that of the screw 5 on the pipe above and midway between the other two said points; the clamping pressure being thereby equalized between the three points of application and the clamp being stabilized against any pivotal movement.

If it be desired to position the pipe lengthwise of the supporting member, the pipe, shown by the dot and dash lines designated by 10$^A$, and the clamp are manipulated to cause the pipe 10$^A$ to rest in the seats 4, as shown in broken lines in Fig. 1, when the assembly is completed. These recesses 4 prevent the pipe from slipping out through the open end of the clamp while the screw 5 is being tightened and thereafter.

It will be seen that the body portion of the clamp just described may be and preferably is a single piece of plate material cut to pattern and bent into a U-shaped form, the only other operation needed to complete the same being the threading of the hole 12 through which the screw 5 passes. Consequently, while the clamp is rugged and efficient, it costs but little. It will also be seen that no special tools are required to fasten or loosen the clamp, a screwdriver being sufficient for that purpose.

In the second form of the invention illustrated in Figs. 1, 2, 4, 5, 6, and 9, the screw 5$^a$ does not engage the conduit 13 but there is provided an additional element generally designated by 14 which is forced against the conduit 13 when the screw 5$^a$ is turned in the clamp-tightening direction. The double armed clamp member generally designated by 15 is similar in structure to the member heretofore described wherein the arms 1$^a$ and 2$^a$ are like the arms 1 and 2, but, instead of the integral arcuate portion 3, the corresponding part of member 15 may preferably be a flat portion 3$^a$ provided with right-angularly bent flat flanges 3$^b$ that merge with and lie in the same planes as the arms 1$^a$ and 2$^a$ corresponding to arms 1 and 2. The large arcuate recesses 4$^a$ in the long edges of the flanges 3$^b$ are there simply to provide clearance for the conduit. The screw-threaded hole 12$^a$ is similar to the hole 12 in the first form. So, also, screw 5$^a$ may be like screw 5.

To increase the adaptability of the clamp to a wider range of conduit diameters the second form of my improved clamp includes the additional element 14 which constitutes the conduit-engaging element and is constructed in the form of rectangular box-like structure having one side open to permit it to be mounted onto the trough-shaped end of the other member 15 in the manner of a cap. This conduit-engaging element 14 is adjustable relatively to the member 15 and to the flange of the supporting member 6 and has in the bottom wall opposite the open side of the same a hole 16 through which the screw 5$^a$ passes freely. This element 14 as well as the cooperating body member 15, may be made from metal plate material, cut to proper pattern and bent into shape. The sides 17 and 18 of the box-like element 14 have in the edges thereof, along the open side of the box, recesses in which pipes or conduits to be clamped to a structural member become seated. The recesses or seats 19 in the edges of the opposite sides 17 of the adjustable conduit-engaging element 14 are, for illustrative purposes, shown to be larger and their radius of curvature greater than is the case with the recesses or seats 20 in the pair of opposite sides 18.

It is preferable to increase the range of adaptability of the device to provide the adjustable conduit-engageable element 14 with said pairs of seats 19 and 20 of relatively different sizes and particularly so when the support-engaging member 15 is constructed with a square base 3$^a$, that is, where the width A is equal to the length B, in which case, the adjustable element 14 may also be of square construction and may be selectively mountable onto the member 15 in relatively different positions thereto to thereby take advantage of the relatively differently sized pairs of seats 19 and 20.

To assemble the parts of the modified form of clamp just described, the conduit-engageable element 14 is slidably mounted onto the support-engaging member 15 and the screw 5$^a$ is inserted through hole 16 and screwed into hole 12$^a$. When the clamp is held upside down, as in Figs. 1, 2 and 4, the element 14 drops down as far as the head of the screw 5$^a$. If the clamp is inverted so that the element 14 is on top member 15, the element 14 will drop until it rests on section 3$^a$ of the cooperating member 15.

The clamp is applied in substantially the same way as the other clamp. In Figs. 1 and 2 the modified form of clamp is shown as securely holding a pipe 13 below the flange 9 as it rests directly against the outer face of flange 9 of the channel 6 and extends lengthwise of the latter. It will be seen that the pipe 13 is seated in the smaller pair of recesses 20 in the element 14. In Fig. 2 there is shown in broken lines the outline of a larger pipe 21 that would be seated in the larger pair of recesses 19 if that pipe were lying transversely of the supporting channel 6 and fastened thereto by the clamp.

It will be seen that both of the forms of my improved clamp are adapted to serve as a means for quickly and securely fastening a pipe or conduit which rests on a supporting member, as do the clamps at the tops of Figs. 1 and 2, or to function as suspending or hanger means in the manner of the lower clamps in these figures. Aside from the fact that the adjustable conduit-engaging element 14 of the second form of clamp takes a better grip on the pipe than can be obtained with the screw alone and has a wider range of adaptability to pipes of varying diameters the increased bearing area obtained between the element 14 and the pipe is of advantage particularly when the clamp functions to suspend a pipe, as shown. However, for most purposes the simpler form of clamp is entirely satisfactory.

While I have illustrated and described with particularly only two preferred forms of my invention, I do not desire to be limted to the exact details so illustrated and described; but intend to cover all forms and constructions coming within the definition constituting the appended claim. I wish it also to be understood that the invention is not restricted in its use to structural steel beams or their flanges; particular reference to structural steel supporting members being made only because the improved clamp is especially well adapted economically and functionally for use in connection therewith and more so than other presently used complicated and expensive clamps. It should also be understood that where I refer to a pipe or a conduit I do not mean to exclude any other object or article which may be secured by the clamp and in the claims the term "conduit" includes pipes, tubular and cylindrical members.

I claim:

A clamp for securing a conduit directly to a flange of a structural steel supporting member, said clamp comprising a pair of horizontally spaced L-shaped arms having an integral wall portion extending in the direction of the lateral leg portions of said arms, said arms being constructed and arranged to engage, with angularly disposed edge portions thereof, an inner sloping face of said flange and to permit the conduit to lie between said integral wall portion and an outer horizontal face of said flange in either any one of two positions which are relatively right-angularly disposed with respect to each other, and means carried on said wall portion, movable relatively to said arms, and adapted to press the conduit against said outer horizontal face of said flange and simultaneously draw said arms against the opposite or inner sloping face of said flange.

EMIL J. MANASEK.

REFERENCES CITED

The following references are of record in the file of this patent:

UNITED STATES PATENTS

| Number | Name | Date |
|---|---|---|
| 728,919 | Horn | May 26, 1903 |
| 1,646,881 | Scheer | Oct. 25, 1927 |
| 1,654,383 | Parrish | Dec. 27, 1927 |
| 1,737,214 | Brown | Nov. 26, 1929 |
| 1,774,878 | Fitzpatrick | Sept. 2, 1930 |
| 1,872,061 | Buchanan | Aug. 16, 1932 |
| 2,071,959 | Wayman | Feb. 23, 1937 |
| 2,163,635 | Shea | June 27, 1939 |
| 2,208,358 | Chandler | July 16, 1940 |